US012355121B2

(12) United States Patent
Woo (10) Patent No.: US 12,355,121 B2
(45) Date of Patent: Jul. 8, 2025

(54) FUEL CELL SYSTEM AND CONDENSATE WATER STORAGE DEVICE

(71) Applicants: HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 635 days.

(21) Appl. No.: 17/699,662

(22) Filed: Mar. 21, 2022

(65) Prior Publication Data
US 2022/0320540 A1 Oct. 6, 2022

(30) Foreign Application Priority Data
Apr. 6, 2021 (KR) .................. 10-2021-0044841

(51) Int. Cl.
*H01M 8/04291* (2016.01)
*H01M 8/04119* (2016.01)
*H01M 8/04492* (2016.01)
*H01M 8/04828* (2016.01)

(52) U.S. Cl.
CPC ... *H01M 8/04291* (2013.01); *H01M 8/04126* (2013.01); *H01M 8/04156* (2013.01); *H01M 8/04492* (2013.01); *H01M 8/04828* (2013.01); *H01M 2250/20* (2013.01)

(58) Field of Classification Search
None
See application file for complete search history.

(56) References Cited

U.S. PATENT DOCUMENTS

| 5,078,440 A * | 1/1992 | Taniguchi | A61G 1/04 294/902 |
| 5,913,505 A * | 6/1999 | Ouvrard | F16K 31/105 251/303 |
| 2002/0025460 A1* | 2/2002 | Horiguchi | H01M 8/04291 429/409 |
| 2008/0135552 A1* | 6/2008 | Baudoux | B60K 15/05 220/203.01 |
| 2009/0162730 A1* | 6/2009 | Ohira | H01M 8/04253 429/410 |
| 2013/0059214 A1* | 3/2013 | Patterson | H01M 8/04291 429/410 |
| 2018/0287107 A1* | 10/2018 | Takayanagi | H01M 50/267 |

FOREIGN PATENT DOCUMENTS

JP 2007115485 A * 5/2007

OTHER PUBLICATIONS

Machine English translation of JP-2007115485-A from Espacenet originally published to Hoshi May 10, 2007 (Year: 2007).*

* cited by examiner

*Primary Examiner* — Ula C Ruddock
*Assistant Examiner* — Mary Grace Byram
(74) *Attorney, Agent, or Firm* — MORGAN, LEWIS & BOCKIUS LLP (57) ABSTRACT

A fuel cell system including a fuel cell stack, a storage container having a storage space to store condensate water produced from the fuel cell stack, and a discharge hole through which the condensate water is discharged to the outside, and a valve unit to selectively open and close the discharge hole, thereby selectively discharging the condensate water, which is produced from the fuel cell stack.

14 Claims, 7 Drawing Sheets

FUEL CELL SYSTEM AND CONDENSATE WATER STORAGE DEVICE

CROSS-REFERENCE TO RELATED APPLICATION

This application claims priority to and the benefit of Korean Patent Application No. 10-2021-0044841 filed in the Korean Intellectual Property Office on Apr. 6, 2021, the entire contents of which are incorporated herein by reference.

TECHNICAL FIELD

The present disclosure relates to a fuel cell system and a condensate water storage device, and more particularly, to a fuel cell system and a condensate water storage device, which are capable of selectively adjusting whether to discharge condensate water.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Further, discharge water (condensate water) and exhaust gas (e.g., unreacted hydrogen), which are produced during the operation of the fuel cell stack, may be discharged to the outside through an exhaust pipe.

Meanwhile, various attempts have been made to apply the fuel cell system to construction machines (e.g., forklifts) as well as passenger vehicles (or commercial vehicles).

The main purpose of the passenger vehicle is to travel on the road, and condensate water, which is produced while the passenger vehicle travels (the fuel cell stack operates), may be discharged onto the road. The risk of an accident does not significantly increase even though the condensate water is discharged onto the road. Therefore, the passenger vehicle may freely discharge the condensate water onto the road without restriction on the discharge of condensate water.

In contrast, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

Therefore, recently, various types of studies have been conducted to selectively adjust whether to discharge the condensate water produced while the fuel cell stack operates, but the study result is still insufficient. Accordingly, there is a need to develop a technology to selectively adjust whether to discharge the condensate water produced while the fuel cell stack operates.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to provide a fuel cell system and a condensate water storage device, which are capable of selectively adjusting whether to discharge condensate water.

In particular, the present disclosure has been made in an effort to selectively discharge condensate water, which is produced from the fuel cell stack, to a predetermined particular location.

The present disclosure has also been made in an effort to reduce the risks of contamination and accident caused by the discharge of condensate water.

The present disclosure has also been made in an effort to improve safety and reliability and create a comfortable working environment.

The objects to be achieved by the embodiments are not limited to the above-mentioned objects, but also include objects or effects that may be understood from the solutions or embodiments described below.

An exemplary embodiment of the present disclosure provides a condensate water storage device including: a storage container defining a storage space configured to store condensate water produced from a fuel cell stack, and having a discharge hole through which the condensate water is discharged to the outside; and a valve unit configured to selectively open and close the discharge hole.

This is to selectively discharge condensate water, which is produced from an object (e.g., a fuel cell stack), to a predetermined particular location.

That is, in the case of a construction machine used in an indoor workplace such as an interior of a factory or warehouse, condensate water, which is produced and discharged onto the floor of the workplace while the construction machine operates (a fuel cell stack operates), may contaminate the floor. Further, the condensate water discharged onto the floor may increase risks of various types of accidents (e.g., a slip-and-fall accident, an electric shock accident, etc.). Therefore, the condensate water, which is produced while the construction machine operates, needs to be discharged only to a predetermined particular location.

However, in the related art, there is a problem in that the condensate water, which is produced from the fuel cell stack while the construction machine operates, is discharged directly onto the floor of the workplace, which contaminates the floor and increases the risk of an accident.

In contrast, according to the embodiment of the present disclosure, the condensate water, which is produced from the fuel cell stack, may be temporarily stored in the storage container and then discharged only to the predetermined particular location without being discharged directly onto the floor of the workplace. Therefore, it is possible to obtain an advantageous effect of inhibiting contamination caused by the condensate water and reducing risks of accidents (e.g., a slip-and-fall accident, an electric shock accident, etc.).

According to another exemplary embodiment of the present disclosure, the storage container may include a container main body having the storage space, and a container cover configured to cover the storage space.

According to the exemplary embodiment of the present disclosure, the condensate water storage device may include a locking groove provided in the container main body, and a locking protrusion provided on the container cover and configured to be locked to the locking groove, and a cut-out slit may be provided at the periphery of the locking protrusion.

Since the container cover and the container main body are locked to each other by means of the locking grooves and the locking protrusions as described above, it is possible to obtain an advantageous effect of stably maintaining the state in which the container cover is coupled to the container main body. In addition, the cut-out slit may be provided at the periphery of the locking protrusion, which makes it possible to improve the dynamic properties of the locking protrusion relative to the container cover and make it easy to couple and separate the locking protrusion to and from the locking groove.

The valve unit may have various structures capable of selectively opening or closing the discharge hole.

For example, the valve unit may include: a valve member configured to be movable between a first position at which the valve member closes the discharge hole and a second position at which the valve member opens the discharge hole; and a driving part configured to selectively move the valve member between the first position and the second position.

The valve member may be configured to move from the first position to the second position in various ways in accordance with required conditions and design specifications. For example, the valve member may rotate between the first position and the second position.

According to the exemplary embodiment of the present disclosure, the valve member may include: a body portion rotatably provided on the storage container; and an opening/closing portion extending from a first end of the body portion and configured to open and close the discharge hole.

The body portion may rotate relative to the storage container in various ways in accordance with required conditions and design specifications. For example, the condensate water storage device may include: a shaft part connected to the body portion; and a support rib disposed on the storage container and having a support hole configured to accommodate the shaft part so that the shaft part is rotatable.

According to the exemplary embodiment of the present disclosure, the condensate water storage device may include a stopper part provided on the shaft part, having a larger cross-sectional area than the shaft part, and configured to lock the body portion to the support rib.

Since the stopper part is provided on the shaft part as described above, it is possible to minimize the movement and separation of the shaft part (the valve member) from the support rib. Therefore, it is possible to obtain an advantageous effect of more stably maintaining the arrangement state of the valve member and improving stability and reliability.

The driving part may have various structures capable of selectively moving the valve member.

For example, the driving part may include: a driving source disposed outside the storage container and configured to provide driving power; and an operating rod configured to be rectilinearly moved by the driving power along a through-hole provided in the storage container, the operating rod being configured to selectively move the opening/closing portion relative to the discharge hole.

As describe above, according to the embodiment of the present disclosure, the driving source may be disposed outside the storage container, such that the sufficient storage space of the storage container may be ensured, and the driving source having comparatively low waterproof performance may be used. Therefore, it is possible to obtain an advantageous effect of reducing the manufacturing costs.

According to the exemplary embodiment of the present disclosure, the condensate water storage device may include an operating protrusion provided on a bottom surface of the opening/closing portion and configured to come into contact with the operating rod, and the operating protrusion may be accommodated in the through-hole at the first position.

As described above, the operating protrusion may be provided on the bottom surface of the opening/closing portion, and the operating protrusion may be accommodated in the through-hole at the first position. Therefore, it is possible to obtain an advantageous effect of minimizing an unnecessary movement of the valve member and more stably maintaining the arrangement state of the valve member in the state in which the valve member is disposed at the first position (the discharge hole is closed).

According to the exemplary embodiment of the present disclosure, the condensate water storage device may include a valve sealing member interposed between the opening/closing portion and the discharge hole.

In addition, according to the exemplary embodiment of the present disclosure, the condensate water storage device may include: a first sealing member configured to seal a gap between the operating rod and the through-hole; and a second sealing member configured to seal a gap between the operating protrusion and the through-hole.

According to the exemplary embodiment of the present disclosure, the condensate water storage device may include an elastic member configured to provide an elastic force to allow the valve member to move to the first position.

Since the elastic member elastically supports the movement of the valve member relative to the storage container as described above, the valve sealing member may be more effectively in close contact with the opening/closing portion and the discharge hole. Therefore, it is possible to obtain an advantageous effect of improving the sealing performance of the valve sealing member.

According to the exemplary embodiment of the present disclosure, the condensate water storage device may include a support portion extending from a second end of the body portion, and the elastic member may elastically support the support portion on the storage container.

According to the exemplary embodiment of the present disclosure, the condensate water storage device may include: an overflow hole provided in the container main body, and the condensate water may be discharged to the outside through the overflow hole when a water level of the condensate water exceeds a reference water level.

As described above, the overflow hole may be provided in the container main body, and the condensate water may be discharged to the outside through the overflow hole when an excessive amount of condensate water flows into the storage container. Therefore, it is possible to obtain an advantageous effect of inhibiting damage to the storage container due to the inflow of the excessive amount of condensate water into the storage container, thereby improving safety and reliability.

According to the exemplary embodiment of the present disclosure, the condensate water storage device may include a level sensor disposed in the storage container and configured to measure a water level of the condensate water.

According to the exemplary embodiment of the present disclosure, the condensate water storage device may include an alarm generation unit configured to generate an alarm signal when the detection result of the level sensor indicates that the water level of the condensate water exceeds a reference water level.

As described above, when the water level of the condensate water exceeds the reference water level, the alarm signal may be generated, and the condensate water may be discharged in a timely manner. Therefore, it is possible to obtain an advantageous effect of inhibiting damage to the storage container due to the inflow of the excessive amount of condensate water into the storage container and minimizing a situation in which the condensate water, which is produced while the fuel cell stack operates, is discharged onto the floor of the workplace.

Another exemplary embodiment of the present disclosure provides a fuel cell system including: a fuel cell stack; a storage container defining a storage space configured to store condensate water produced from the fuel cell stack, and having a discharge hole through which the condensate water is discharged to the outside; and a valve unit configured to selectively open and close the discharge hole.

In particular, the valve unit may include: a valve member configured to be movable between a first position at which the valve member closes the discharge hole and a second position at which the valve member opens the discharge hole; and a driving part configured to selectively move the valve member between the first position and the second position, and the driving part may include: a driving source disposed outside the storage container and configured to provide driving power; and an operating rod configured to be rectilinearly moved by the driving power along a through-hole provided in the storage container, the operating rod being configured to selectively move the valve member relative to the discharge hole.

Other features and aspects will be apparent from the following detailed description, the drawings, and the claims.

DETAILED DESCRIPTION

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 7, a condensate water storage device 100 according to an embodiment of the present disclosure includes: a storage container 200 having a storage space 210a configured to store condensate water, and a discharge hole 211 through which the condensate water is discharged to the outside; and a valve unit 300 configured to selectively open or close the discharge hole 211.

For reference, the condensate water storage device 100 according to the embodiment of the present disclosure may be used to store condensate water produced from an object. The present disclosure is not restricted or limited by the type and structure of the object to which the condensate water storage device 100 is applied.

In particular, the condensate water storage device 100 according to the embodiment of the present disclosure may be used to temporarily store condensate water produced from a fuel cell system 10 applied to a construction machine such as a forklift.

According to another embodiment of the present disclosure, the condensate water storage device 100 may be applied to mobility vehicles such as various vehicles (e.g., passenger vehicles or commercial vehicles), ships, and aircrafts to which the fuel cell system 10 may be applied.

Figure 1:
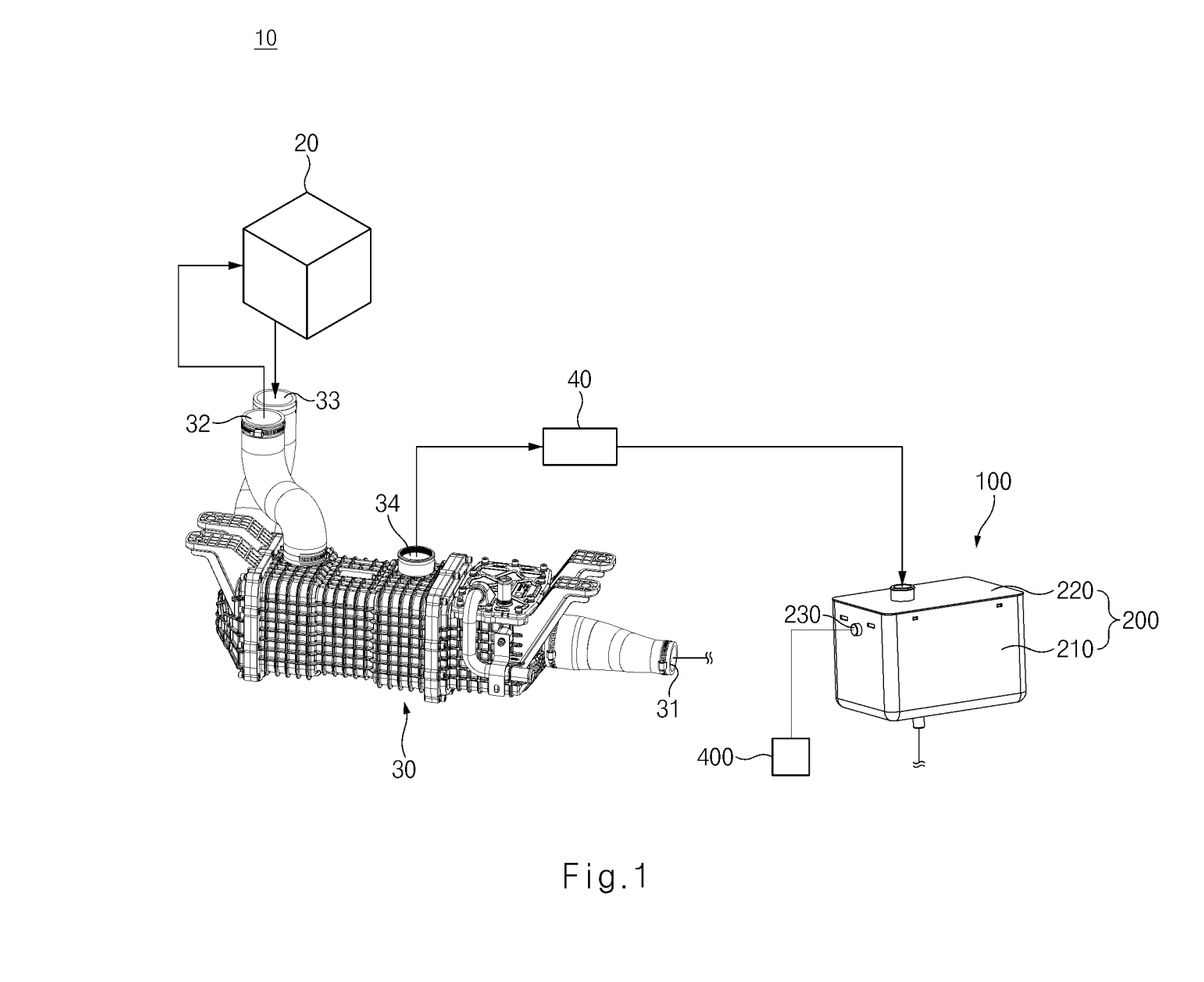
FIG. 1 is a view for explaining a fuel cell system according to an embodiment of the present disclosure.

According to the exemplary embodiment of the present disclosure, the fuel cell system 10 may include: a fuel cell stack 20; a storage container 200 having a storage space 210a configured to store condensate water produced from the fuel cell stack 20, and a discharge hole 211 through which the condensate water is discharged to the outside; and a valve unit 300 configured to selectively open or close the discharge hole 211.

The fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

According to the exemplary embodiment of the present disclosure, the fuel cell system 10 may include a humidifier 30 configured to humidify inflow gas (dry air) by using moist air discharged from the fuel cell stack 20.

The humidifier 30 may have various structures capable of humidifying the inflow gas by using the moist air discharged from the fuel cell stack 20. The present disclosure is not restricted or limited by the type and structure of the humidifier 30.

For example, the humidifier 30 may include an inflow gas supply port 31 through which inflow gas is introduced (supplied), an inflow gas discharge port 32 through which the (humidified) inflow gas having passed through the interior of the humidifier 30 is discharged, a moist air supply port 33 through which moist air discharged from the fuel cell stack 20 is supplied, and a moist air discharge port 34 through which the moist air, which has humidified the inflow gas, is discharged to the outside.

The inflow gas supplied through the inflow gas supply port 31 may be humidified by the moist air while passing through a humidification membrane (e.g., a hollow fiber membrane) (not illustrated) disposed in the humidifier 30. Then, the humidified inflow gas may be supplied to the fuel cell stack 20 through the inflow gas discharge port 32.

Further, the moist air (or produced water) discharged from the fuel cell stack 20 may be supplied to the moist air supply port 33, humidify the inflow gas in the humidifier 30, and then be discharged to the outside of the humidifier 30 through the moist air discharge port 34.

According to the exemplary embodiment of the present disclosure, the storage container 200 may serve to store the condensate water discharged to the outside of the humidifier 30 through the moist air discharge port 34.

In particular, a silencer 40 may be disposed on a connection line (not illustrated) that connects the humidifier 30 and the storage container 200. The silencer 40 may serve to reduce discharge noise of exhaust gas discharged along the connection line.

In the embodiment of the present disclosure illustrated and described above, the example has been described in which the condensate water produced from the fuel cell stack 20 is supplied to the storage container 200 via the humidifier 30 and the silencer 40. However, according to another embodiment of the present disclosure, the condensate water produced from the fuel cell stack may be supplied directly to the storage container.

Figure 2:
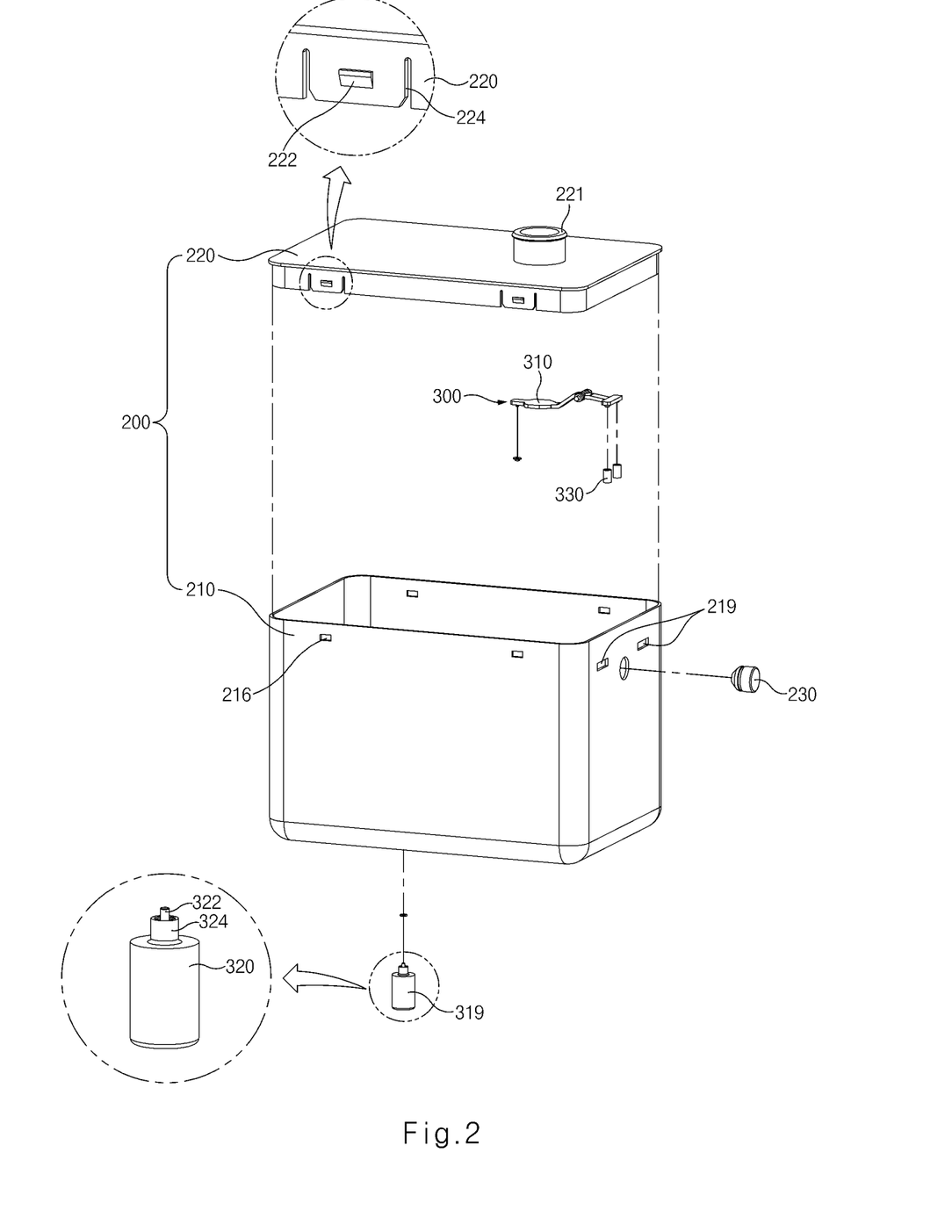
FIG. 2 is a view for explaining a condensate water storage device of the fuel cell system according to the embodiment of the present disclosure.
Figure 3:
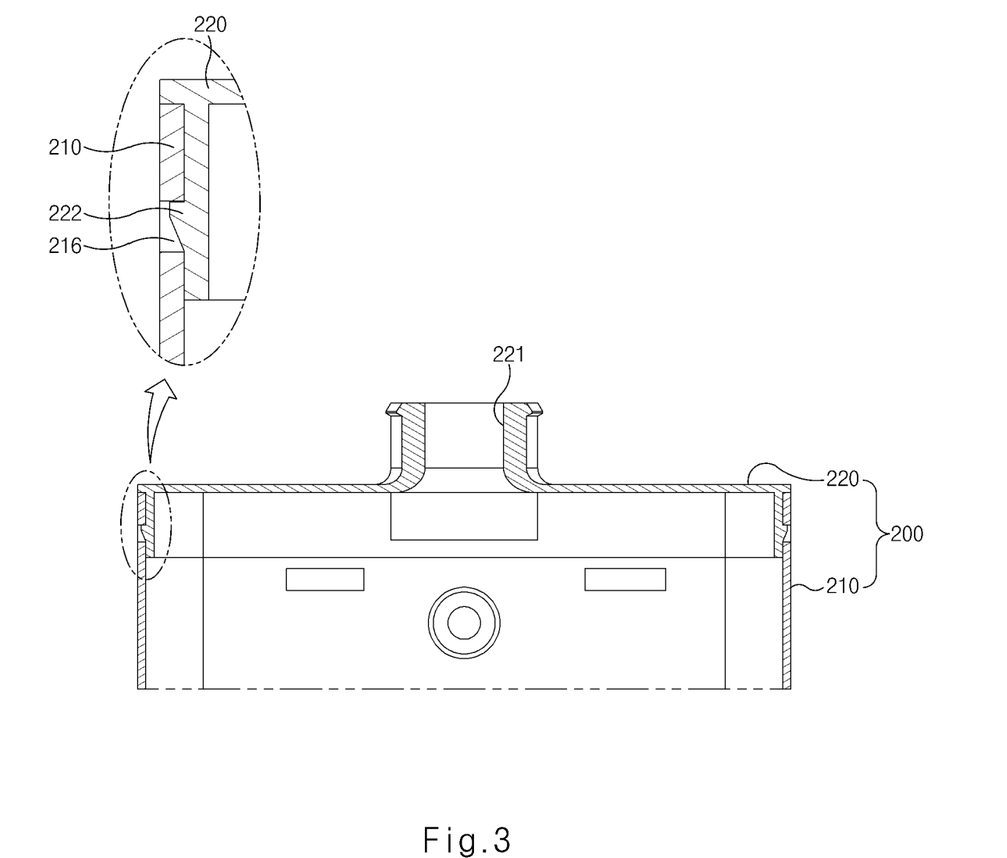
FIG. 3 is a view for explaining a storage container of the fuel cell system according to the embodiment of the present disclosure.

Referring to FIGS. 1 to 3, the storage container 200 has the storage space 210a configured to store the condensate water (e.g., the condensate water produced from the fuel cell stack 20), and the discharge hole 211 through which the condensate water is discharged to the outside.

The storage container 200 may have various structures having the storage space 210a and the discharge hole 211. The present disclosure is not restricted or limited by the shape and structure of the storage container 200.

For example, the storage container 200 may include a container main body 210 having the storage space 210a, and a container cover 220 configured to cover the storage space 210a.

The container main body 210 may be variously changed in shape and structure in accordance with required conditions and design specifications. The present disclosure is not restricted or limited by the shape and structure of the container main body 210. For example, the container main body 210 may be provided in the form of a quadrangular box having the storage space 210a opened at an upper side thereof.

The discharge hole 211 (e.g., the circular discharge hole) may be provided in a bottom portion of the container main body 210, and the condensate water stored in the storage space 210a may be discharged to the outside of the storage container 200 through the discharge hole 211.

The container cover 220 is disposed at an upper side of the container main body 210 and serves to cover the storage space 210a. The container cover 220 may have an inlet port 221, and one end of the connection line configured to connect the humidifier 30 (the moist air discharge port) and the storage container 200 may be connected to the inlet port 221.

According to another embodiment of the present disclosure, the discharge hole may be provided in a sidewall portion of the container main body. In addition, according to another embodiment of the present disclosure, two or more inlet ports may be provided in the container cover. Alternatively, the inlet port may be provided in the container main body instead of the container cover.

Referring to FIGS. 2 and 3, the condensate water storage device 100 according to the exemplary embodiment of the present disclosure may include locking grooves 216 provided in the container main body 210, and locking protrusions 222 provided on the container cover 220 and configured to be locked to the locking grooves 216. Cut-out slits 224 may be provided at the periphery of the locking protrusions 222.

The locking protrusion 222 may have various structures capable of being locked to the locking groove 216. The present disclosure is not restricted or limited by the structure of the locking protrusion 222.

For example, when the container cover 220 is coupled to an upper portion of the container main body 210, the locking protrusions 222 may be accommodated in the locking grooves 216 and locked to inner wall surfaces of the locking grooves 216.

Since the container cover 220 and the container main body 210 are locked to each other by means of the locking grooves 216 and the locking protrusions 222 as described above, it is possible to obtain an advantageous effect of stably maintaining the state in which the container cover 220 is coupled to the container main body 210.

In particular, the condensate water storage device 100 may include one or more cut-out slits 224 provided in the container cover 220 and disposed adjacent to the locking protrusion 222.

The cut-out slit 224 may be made by partially removing (cutting) a part of the container cover 220. The present disclosure is not restricted or limited by the shape and structure of the cut-out slit 224.

For example, the cut-out slits 224 may be provided in an upward/downward direction and disposed at two opposite left and right sides of the locking protrusion 222 based on the locking protrusion 222.

According to another embodiment of the present disclosure, the cut-out slit may be provided in a leftward/rightward direction or other directions based on the locking protrusion. Alternatively, the cut-out slit may have a curved shape such as an 'S' shape or a 'C' shape.

As described above, the cut-out slits 224 may be provided at the periphery of the locking protrusion 222, which makes it possible to improve the dynamic properties of the locking protrusion 222 (the properties that allow the locking protrusion 222 to freely move) relative to the container cover 220 and make it easy to couple and separate the locking protrusion 222 to and from the locking groove 216.

Referring to FIGS. 4 to 7, the valve unit 300 serves to selectively open or close the discharge hole 211.

Figure 4:
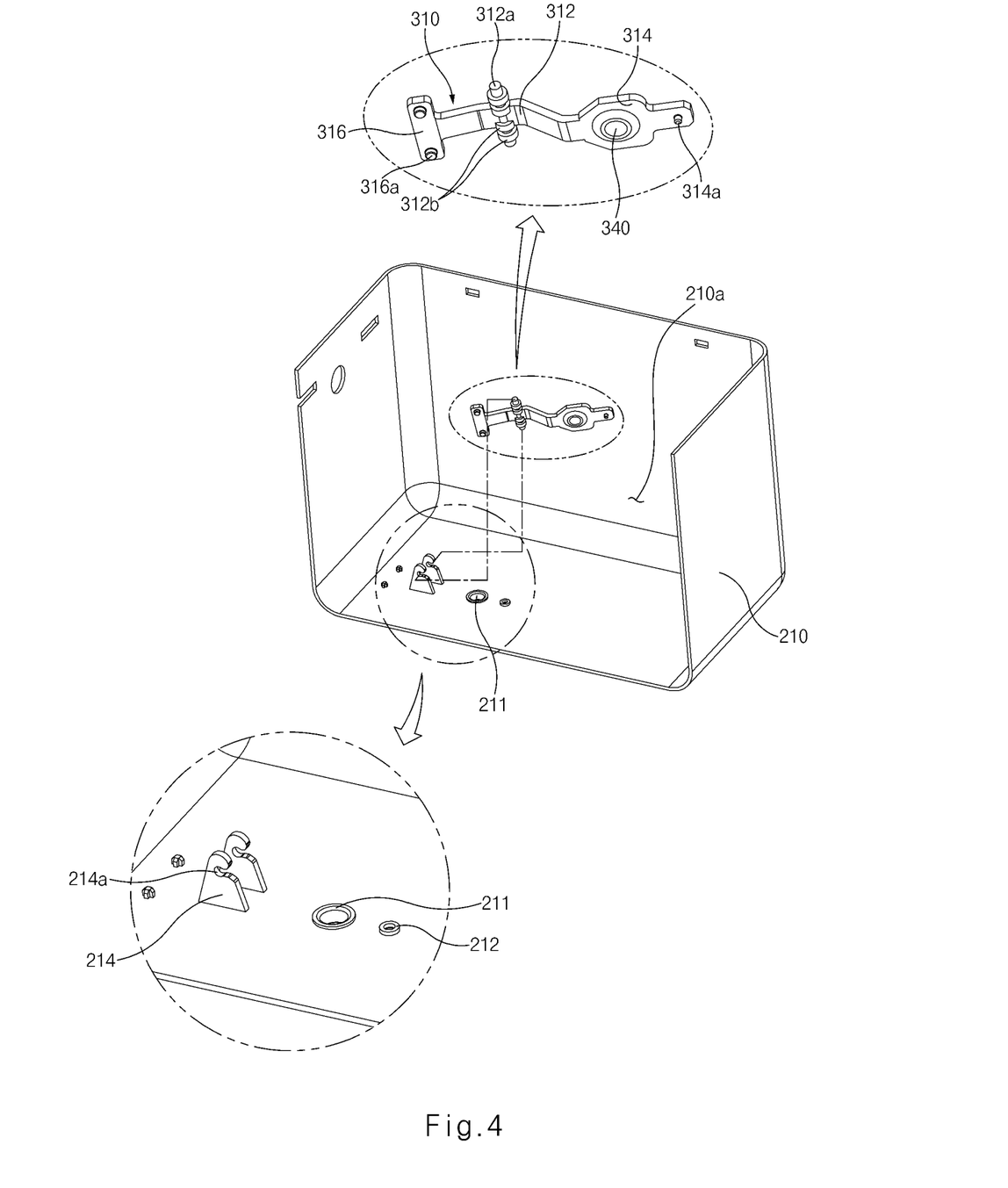
FIGS. 4 and 5 are views for explaining a structure of a valve unit of the fuel cell system according to the embodiment of the present disclosure.
Figure 5:
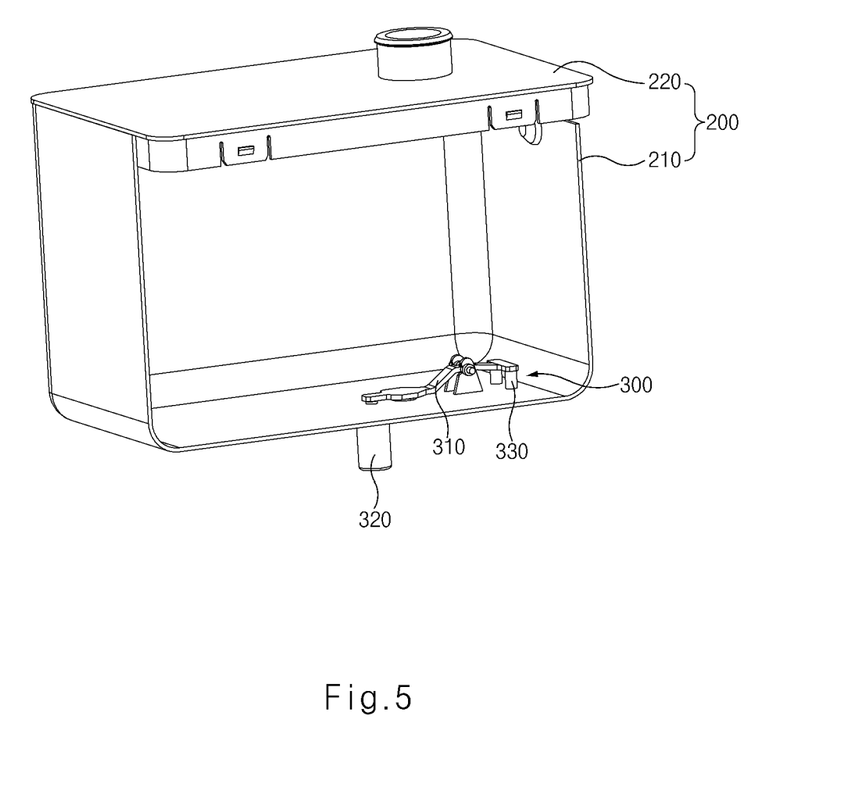

The valve unit 300 may have various structures capable of selectively opening or closing the discharge hole 211. The present disclosure is not restricted or limited by the structure of the valve unit 300.

For example, the valve unit 300 may include: a valve member 310 configured to be movable from a first position at which the valve member 310 closes the discharge hole 211 to a second position at which the valve member 310 opens the discharge hole 211; and a driving part 319 configured to selectively move the valve member 310 from the first position to the second position.

In this case, the configuration in which the valve member 310 is positioned at the first position means that the valve member 310 is positioned to close the discharge hole 211, and the configuration in which the valve member 310 is positioned at the second position means that the valve member 310 is positioned to open the discharge hole 211.

The valve member 310 may be configured to move from the first position to the second position in various ways in accordance with required conditions and design specifications.

For example, the valve member 310 may be configured to rotate from the first position to the second position (or from the second position to the first position).

According to the exemplary embodiment of the present disclosure, the valve member 310 may include: a body portion 312 rotatably provided on the storage container 200; and an opening/closing portion 314 integrally extending from one end of the body portion 312 and configured to open or close the discharge hole 211.

More specifically, the opening/closing portion 314 may be integrally connected to the body portion 312 and open or close the discharge hole 211 while rotating together with the body portion 312 when the body portion 312 rotates.

The body portion 312 may be configured to rotate relative to the storage container 200 in various ways in accordance with required conditions and design specifications. The present disclosure is not restricted or limited by the structure for rotating the body portion 312 relative to the storage container 200.

For example, the condensate water storage device 100 may include: shaft parts 312a connected to the body portion 312; and support ribs 214 disposed on the storage container 200 and respectively having support holes 214a configured to accommodate the shaft parts 312a so that the shaft parts 312a are rotatable.

For example, the shaft parts 312a may protrude from two opposite portions of the body portion 312. A pair of support ribs 214 may be disposed on the bottom portion of the storage container 200 and spaced apart from each other. The support holes 214a may be respectively provided in the support ribs 214 and accommodate the shaft parts 312a so that the shaft parts 312a are rotatable.

According to the exemplary embodiment of the present disclosure, the support hole 214a may have a diameter corresponding to a diameter of the shaft part 312a. An inlet (opening portion) (not illustrated) may be provided at one side of the support hole 214a, and the shaft part 312a may enter the support hole 214a through the inlet. The shaft part 312a may be accommodated in the support hole 214a through the inlet.

Since the support rib 214 has the support hole 214a having the inlet as described above, the shaft part 312a may be coupled to the support hole 214a even though the shaft part 312a and the body portion 312 are integrated into a unitary body. Therefore, it is possible to obtain an advantageous effect of simplifying the structure and process for fastening and assembling the storage container 200 and the body portion 312.

According to another embodiment of the present disclosure, the body portion and the shaft part may be separably and independently provided, and the body portion may be rotatably assembled (coupled) to the storage container by means of the shaft part.

According to the exemplary embodiment of the present disclosure, the condensate water storage device 100 may include stopper parts 312b respectively provided on the shaft parts 312a. The stopper part 312b may have a larger cross-sectional area than the shaft part 312a and lock the body portion 312 to the support rib 214.

The stopper part 312b may have various structures capable of locking the body portion 312 to the support rib 214 (e.g., restricting a movement of the stopper part 312b in an axis direction).

For example, the stopper part 312b may be provided in the form of a circular flange having a larger cross-sectional area than the shaft part 312a. The stopper parts 312b may be disposed adjacent to (in close contact with) two opposite surfaces of the support rib 214 with the support rib 214 interposed therebetween.

Since the stopper parts 312b are provided on the shaft parts 312a as described above, it is possible to minimize the movement and separation of the shaft parts 312a (the valve member) from the support ribs 214. Therefore, it is possible to obtain an advantageous effect of more stably maintaining the arrangement state of the valve member 310 and improving stability and reliability.

The driving part 319 serves to selectively move the valve member 310 from the first position to the second position.

The driving part 319 may have various structures capable of selectively moving the valve member 310. The present disclosure is not restricted or limited by the type and structure of the driving part 319.

For example, the driving part 319 may include: a driving source 320 disposed outside the storage container 200 and configured to provide driving power; and an operating rod 322 configured to be rectilinearly moved by the driving power along a through-hole 212 provided in the storage container 200, the operating rod 322 being configured to selectively move the opening/closing portion 314 relative to the discharge hole 211.

For example, a typical solenoid may be used as the driving source 320. According to another embodiment of the present disclosure, a motor or cylinder (e.g., a pneumatic or hydraulic cylinder) may be used as the driving source.

In particular, a fastening portion 218 may protrude from a lower portion of the storage container 200, and the driving source 320 may have a fastening boss 324 fastened (e.g., screw-fastened) to the fastening portion 218.

The operating rod 322 may be rectilinearly moved (reciprocated) by the driving power of the driving source 320 in a direction (e.g., an upward/downward direction based on FIG. 7) in which the operating rod 322 is moved toward or away from the valve member.

More specifically, one end of the operating rod 322 may be connected to the driving source 320, and the other end of the operating rod 322 may pass through the through-hole 212 and be disposed adjacent to the valve member 310 (e.g., a bottom surface of the opening/closing portion), such that the operating rod 322 may be rectilinearly moved in the upward/downward direction by the driving power of the driving source 320.

According to the exemplary embodiment of the present disclosure, the condensate water storage device 100 may include an operating protrusion 314a provided on the bottom surface of the opening/closing portion 314 and configured to come into contact with the operating rod 322. At the first position, the operating protrusion 314a may be accommodated in the through-hole 212.

As described above, the operating protrusion 314a may be provided on the bottom surface of the opening/closing portion 314, and the operating protrusion 314a may be accommodated in the through-hole 212 at the first position. Therefore, it is possible to obtain an advantageous effect of minimizing an unnecessary movement of the valve member 310 and more stably maintaining the arrangement state of the valve member 310 in the state in which the valve member 310 is disposed at the first position (the discharge hole is closed).

Meanwhile, according to another embodiment of the present disclosure, the driving source may be disposed inside the storage container. However, if the driving source is disposed inside the storage container, it is difficult to ensure a sufficient storage space of the storage container, and waterproof performance of the driving source needs to be necessarily ensured, which causes a problem of an increase in manufacturing costs.

In contrast, according to the embodiment of the present disclosure, the driving source 320 may be disposed outside the storage container 200, such that the sufficient storage space 210a of the storage container 200 may be ensured, and the driving source 320 having comparatively low waterproof performance may be used. Therefore, it is possible to obtain an advantageous effect of reducing the manufacturing costs.

According to the exemplary embodiment of the present disclosure, the condensate water storage device 100 may include a valve sealing member 340 interposed between the opening/closing portion 314 and the discharge hole 211.

The valve sealing member 340 serves to seal a gap between the opening/closing portion 314 and the discharge hole 211.

The valve sealing member 340 may have various structures and be made of various materials in accordance with required conditions and design specifications. The present disclosure is not restricted or limited by the structure and material of the valve sealing member 340.

For example, the valve sealing member 340 may be made of an elastic material such as rubber, silicone, or urethane.

According to the exemplary embodiment of the present disclosure, the valve sealing member 340 may have an approximately dome shape having a diameter corresponding to the discharge hole 211 and be provided integrally with a bottom surface of the opening/closing portion 314. For example, the valve sealing member 340 may be integrated with the valve member 310 by double injection molding.

According to another embodiment of the present disclosure, the valve sealing member may be attached to (or assembled with) a bottom surface of the opening/closing portion.

The valve sealing member 340 may seal the gap between the opening/closing portion 314 and the discharge hole 211 in a state in which one surface of the valve sealing member 340 is seated in the discharge hole 211 (the valve member is moved to the first position). Therefore, it is possible to obtain an advantageous effect of minimizing a leak of the condensate water through the gap between the opening/closing portion 314 and the discharge hole 211.

According to the exemplary embodiment of the present disclosure, the condensate water storage device 100 may include: a first sealing member 350 configured to seal a gap between the operating rod 322 and the through-hole 212; and a second sealing member 360 configured to seal a gap between the operating protrusion 314a and the through-hole 212.

The first sealing member 350 may have various structures capable of sealing the gap between the operating rod 322 and the through-hole 212. The present disclosure is not restricted or limited by the structure and material of the first sealing member 350.

For example, the first sealing member 350 may be provided in the form of a ring made of an elastic material such as rubber, silicone, or urethane. The first sealing member 350 may be accommodated in the fasting boss and disposed at the end of the fastening portion 218.

The second sealing member 360 may have various structures capable of sealing the gap between the operating protrusion 314a and the through-hole 212. The present disclosure is not restricted or limited by the structure and material of the second sealing member 360.

For example, the second sealing member 360 may be provided in the form of a ring made of an elastic material such as rubber, silicone, or urethane. The second sealing member 360 may surround the operating protrusion 314a. According to another embodiment of the present disclosure, the second sealing member may be disposed on an inner wall surface of the through-hole.

As described above, according to the embodiment of the present disclosure, the through-hole 212 may be sealed by the dual sealing structure including the first and second sealing members 350 and 360. Therefore, it is possible to obtain an advantageous effect of minimizing a leak of condensate water through the through-hole 212 and inhibiting the driving source 320 from being submerged in the condensate water.

According to the exemplary embodiment of the present disclosure, the condensate water storage device 100 may include elastic members 330 configured to provide an elastic force to allow the valve member 310 to move to the first position.

The elastic member 330 serves to elastically support the movement (rotation) of the valve member 310 relative to the storage container 200.

Since the elastic member 330 elastically supports the movement (rotation) of the valve member 310 relative to the storage container 200 as described above, the valve sealing member 340 may be more effectively in close contact with the opening/closing portion 314 and the discharge hole 211. Therefore, it is possible to obtain an advantageous effect of improving the sealing performance of the valve sealing member 340.

A typical elastic means capable of elastically supporting the movement of the valve member 310 relative to the storage container 200 may be used as the elastic member 330. The present disclosure is not restricted or limited by the type and structure of the elastic member 330. For example, a spring may be used as the elastic member 330.

According to the exemplary embodiment of the present disclosure, the condensate water storage device 100 may include a support portion 316 extending from the other end of the body portion 312. The elastic member 330 may serve to elastically support the support portion 316 on the storage container 200.

According to another embodiment of the present disclosure, the elastic member may elastically support the body portion or the opening/closing portion instead of the support portion.

In particular, the support portion 316 may have support protrusions 316a. One end of the elastic member 330 may be disposed to surround the support protrusion 316a. As described above, the support protrusion 316a may be provided on the support portion 316, and the support protrusion 316a may be accommodated in the elastic member 330. Therefore, it is possible to obtain an advantageous effect of more stably maintaining the arrangement state of the elastic member 330 and minimizing the separation of the elastic member 330.

In the embodiment of the present disclosure illustrated and described above, the example has been described in which the valve member 310 rotates from the first position to the second position. However, according to another embodiment of the present disclosure, the valve member may be configured to rectilinearly move from the first position to the second position.

Figure 6:
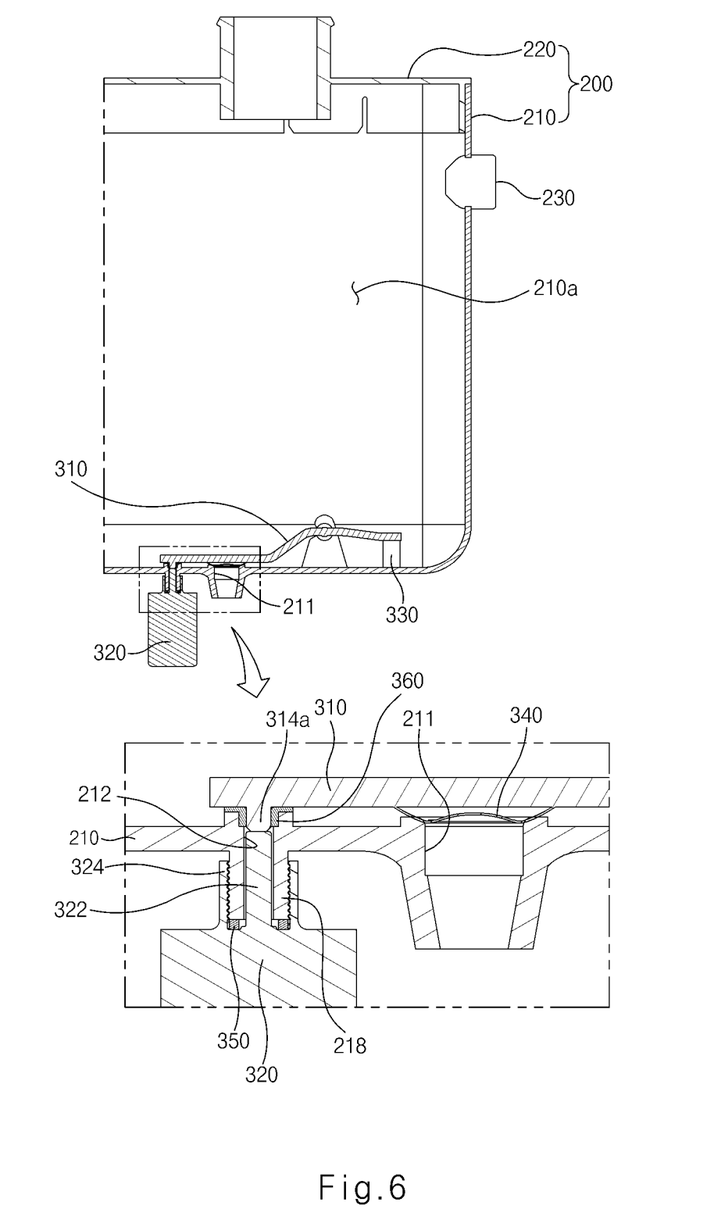
FIG. 6 is a view for explaining a closed state of a discharge hole of the fuel cell system according to the embodiment of the present disclosure.
Figure 7:
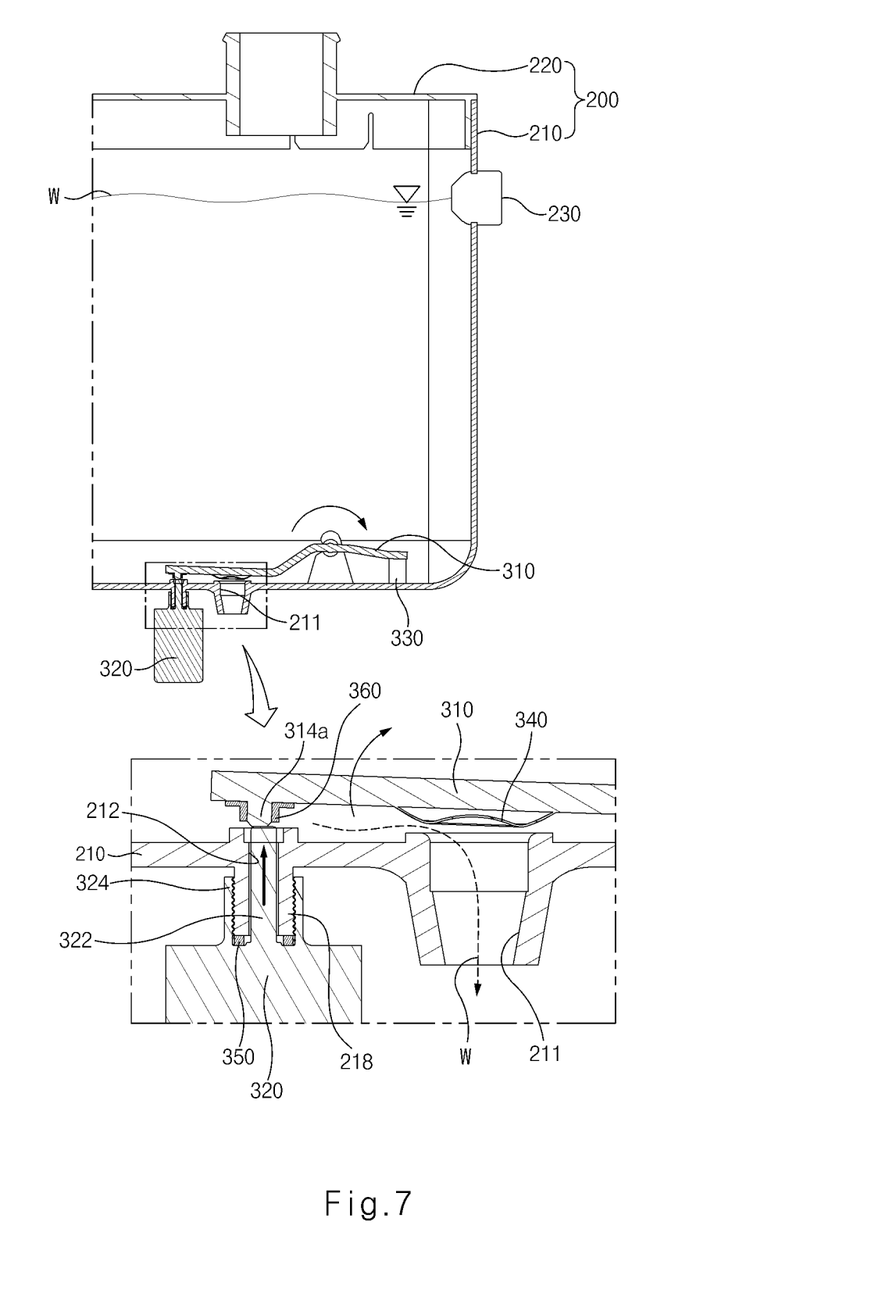
FIG. 7 is a view for explaining an opened state of the discharge hole of the fuel cell system according to the embodiment of the present disclosure.

Meanwhile, FIG. 6 is a view for explaining the closed state of the discharge hole 211 of the fuel cell system 10 according to the embodiment of the present disclosure, and FIG. 7 is a view for explaining the opened state of the discharge hole 211 of the fuel cell system 10 according to the embodiment of the present disclosure.

Referring to FIG. 6, in a state in which the operating rod 322 is lowered, the valve member 310 may be disposed at the position (first position) at which the valve member 310 closes the discharge hole 211. The state in which the valve member 310 closes the discharge hole 211 may be elastically supported by the elastic force of the elastic member 330.

In contrast, referring to FIG. 7, when the operating rod 322 is raised (moved upward), the valve member 310 is rotated clockwise (based on FIG. 7) by the operating rod 322, such that the valve member 310 may be disposed at the position (second position) at which the valve member 310 opens the discharge hole 211. In this case, the elastic member 330 may be compressed while accumulating the elastic force. In the state in which the discharge hole 211 is opened, condensate water W accommodated in the storage container 200 may be discharged to the outside of the storage container 200 through the discharge hole 211.

According to the exemplary embodiment of the present disclosure, the condensate water storage device 100 may include overflow holes 219 provided in the container main body 210, and the condensate water may be discharged to the outside through the overflow holes 219 when a water level of the condensate water exceeds a preset reference water level.

The overflow hole 219 may be variously changed in structure and position in accordance with required conditions and design specifications.

As described above, the overflow holes 219 may be provided in the container main body 210, and the condensate water may be discharged to the outside through the overflow holes 219 when an excessive amount of condensate water flows into the storage container 200. Therefore, it is possible to obtain an advantageous effect of inhibiting damage to the storage container 200 due to the inflow of the excessive amount of condensate water into the storage container 200, thereby improving safety and reliability.

In addition, according to the exemplary embodiment of the present disclosure, the condensate water storage device 100 may include a level sensor 230 disposed in the storage container 200 and configured to detect the water level of the condensate water.

For example, the level sensor 230 may be disposed on the sidewall portion of the container main body 210. The level sensor 230 may collect the water levels of the condensate water stored in the container main body 210.

Various sensors capable of collecting the water levels of the condensate water may be used as the level sensor 230. The present disclosure is not restricted or limited by the type of level sensor 230 and the method of measuring the water level.

For example, a contact level sensor (e.g., a float switch) or a contactless level sensor (e.g., an ultrasonic level sensor or a capacitance level sensor), which may collect the water level of the condensate water, may be used as the level sensor 230.

According to the exemplary embodiment of the present disclosure, the condensate water storage device 100 may include an alarm generation unit 400 configured to generate an alarm signal when the detection result of the level sensor 230 indicates that the water level of the condensate water exceeds the preset reference water level.

In this case, the alarm signal may include at least one of an auditory alarm signal made by a typical sound means and a visual alarm signal made by a typical warning lamp. In addition, other various alarm signals may be used to inform a user (operator) of a situation in which the water level of the condensate water is excessively increased.

As described above, when the water level of the condensate water exceeds the preset reference water level, the alarm signal may be generated, and the condensate water may be discharged in a timely manner. Therefore, it is possible to obtain an advantageous effect of inhibiting damage to the storage container 200 due to the inflow of the excessive amount of condensate water into the storage container 200 and minimizing a situation in which the condensate water, which is produced while the fuel cell stack 20 operates, is discharged onto the floor of the workplace.

According to the embodiment of the present disclosure described above, it is possible to obtain an advantageous effect of selectively adjusting whether to discharge the condensate water.

In particular, according to the embodiment of the present disclosure, it is possible to obtain an advantageous effect of selectively discharging the condensate water, which is produced from the fuel cell stack, to the predetermined particular location.

In addition, according to the embodiment of the present disclosure, it is possible to obtain an advantageous effect of reducing the risks of contamination and accident caused by the discharge of condensate water.

In addition, according to the embodiment of the present disclosure, it is possible to obtain an advantageous effect of improving safety and reliability and creating a comfortable working environment.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A condensate water storage device comprising:
a storage container defining a storage space configured to store condensate water, and comprising a discharge hole through which the condensate water is discharged to the outside; and
a valve unit configured to selectively open and close the discharge hole,
wherein the valve unit comprises:
a valve member configured to be movable from a first position at which the valve member closes the discharge hole to a second position at which the valve member opens the discharge hole; and
a driving part configured to selectively move the valve member between the first position and the second position,
wherein the valve member comprises:
a body portion configured to rotate and disposed on the storage container; and
an opening/closing portion extending from a first end of the body portion and configured to open and close the discharge hole,
wherein the driving part comprises:
a driving source configured to provide driving power; and
an operating rod configured to be rectilinearly moved by the driving power along a through-hole disposed in the storage container, the operating rod being configured to selectively move the opening/closing portion relative to the discharge hole,
the condensate water storage device comprising:
an operating protrusion disposed on the opening/closing portion and configured to come into contact with the operating rod,
wherein the operating protrusion is accommodated in the through-hole at the first position.

2. The condensate water storage device of claim 1, comprising:
a shaft part connected to the body portion; and
a support rib disposed on the storage container and comprising a support hole configured to accommodate the shaft part so that the shaft part is rotatable.

3. The condensate water storage device of claim 2, comprising:
a stopper part disposed on the shaft part, having a larger cross-sectional area than the shaft part, and configured to lock the body portion to the support rib.

4. The condensate water storage device of claim 1, comprising:
an elastic member configured to provide an elastic force to allow the valve member to move to the first position.

5. The condensate water storage device of claim 4, comprising:
a support portion extending from a second end of the body portion,
wherein the elastic member elastically supports the support portion on the storage container.

6. The condensate water storage device of claim 1, comprising:
a first sealing member configured to seal a gap between the operating rod and the through-hole; and
a second sealing member configured to seal a gap between the operating protrusion and the through-hole.

7. The condensate water storage device of claim 1, comprising:
a valve sealing member interposed between the opening/closing portion and the discharge hole.

8. The condensate water storage device of claim 1, wherein the storage container comprises:
a container main body defining the storage space; and
a container cover configured to cover the storage space.

9. The condensate water storage device of claim 8, comprising:
an overflow hole disposed in the container main body,
wherein the condensate water is discharged to the outside through the overflow hole when a water level of the condensate water exceeds a reference water level.

10. The condensate water storage device of claim 8, comprising:
a locking groove disposed in the container main body; and
a locking protrusion provided on the container cover and configured to be locked to the locking groove.

11. The condensate water storage device of claim 10, comprising:
a cut-out slit disposed in the container cover adjacent to the locking protrusion.

12. The condensate water storage device of claim 1, comprising:
a level sensor disposed in the storage container and configured to measure a water level of the condensate water.

13. The condensate water storage device of claim 12, comprising:
an alarm generation unit configured to generate an alarm signal when the detection result of the level sensor indicates that the water level of the condensate water exceeds a reference water level.

14. A fuel cell system comprising:
a fuel cell stack;
a storage container defining a storage space configured to store condensate water produced from the fuel cell stack, and comprising a discharge hole through which the condensate water is discharged to the outside; and
a valve unit configured to selectively open and close the discharge hole,
wherein the valve unit comprises:
a valve member configured to be movable from a first position at which the valve member closes the discharge hole to a second position at which the valve member opens the discharge hole; and
a driving part configured to selectively move the valve member between the first position and the second position,
wherein the valve member comprises:
a body portion configured to rotate and disposed on the storage container; and
an opening/closing portion extending from a first end of the body portion and configured to open and close the discharge hole,
wherein the driving part comprises:
a driving source configured to provide driving power; and
an operating rod configured to be rectilinearly moved by the driving power along a through-hole disposed in the storage container, the operating rod being configured to selectively move the opening/closing portion relative to the discharge hole,
the condensate water storage device comprising:
an operating protrusion disposed on the opening/closing portion and configured to come into contact with the operating rod,
wherein the operating protrusion is accommodated in the through-hole at the first position.

* * * * *